United States Patent

[11] 3,546,430

| [72] | Inventor | James Merel Kane |
| | | Shaker Heights, Ohio |
| [21] | Appl. No. | 788,184 |
| [22] | Filed | Dec. 31, 1968 |
| [45] | Patented | Dec. 8, 1970 |
| [73] | Assignee | The Tremco Manufacturing Company |
| | | Cleveland, Ohio |
| | | a corporation of Ohio |

[54] APPARATUS FOR HEATING CAULKING MATERIALS
8 Claims, 8 Drawing Figs.

[52] U.S. Cl............................................. 219/316,
219/320, 219/523, 165/109, 259/88
[51] Int. Cl........................................ H05b 3/78
[50] Field of Search.......................................... 259/88,
108, 81, 84, 93, 155—159; 219/523, 437, 521,
389; 219/316—321, 415, 418, 439, 469; 13/21;
165/109, 86, 74, 105

[56] References Cited
UNITED STATES PATENTS
1,559,002  10/1925  Plastino..................... 259/108

| 1,692,270 | 11/1928 | Jensen............................. | 219/316 |
| 2,835,480 | 5/1958 | Perez ........................... | 165/105 |

FOREIGN PATENTS

| 563,690 | 11/1932 | Germany...................... | 219/523 |
| 1,106,901 | 7/1955 | France ......................... | 219/316 |

Primary Examiner—Volodymyr Y. Mayewsky
Attorney—Yount & Tarolli

ABSTRACT: An apparatus for heating caulking materials from an ambient temperature to a usable temperature preparatory to use. The apparatus comprises a container, an elongated heater blade, means for supporting the blade generally vertically in the container, means for electrically energizing the blade, and means for causing relative rotation between the container and the blade. The method includes the steps of placing the elongated heater blade in a container of caulking material, producing relative rotation between the container and heater blade, increasing the temperature of the heater blade above the usable temperature, maintaining the heater blade at this temperature until the material reaches the usable temperature, and thereafter reducing the temperature of the heater blade.

PATENTED DEC 8 1970

INVENTOR.
JAMES MEREL KANE
BY
Meyer, Tilberry & Body
ATTORNEYS.

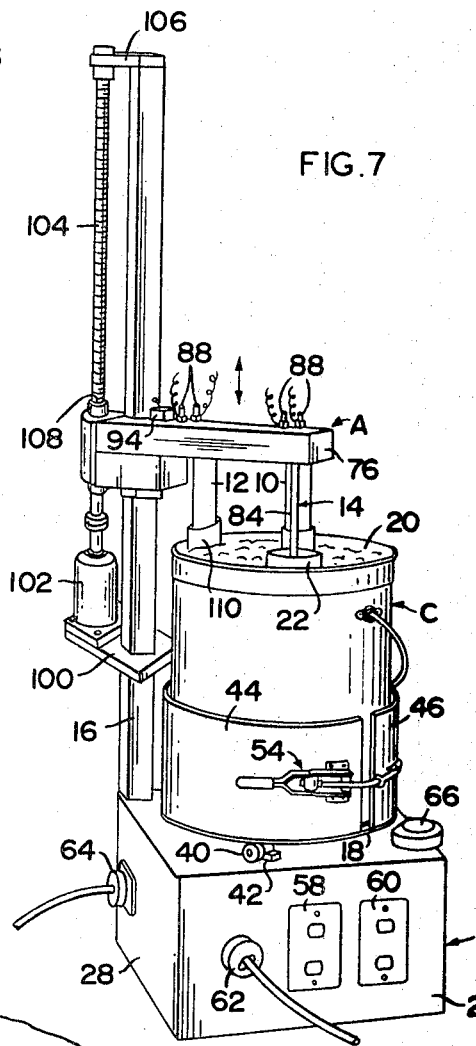
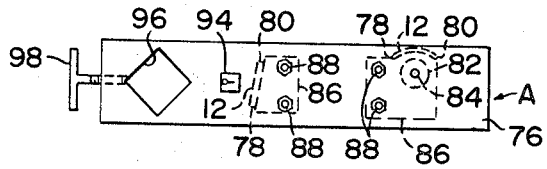
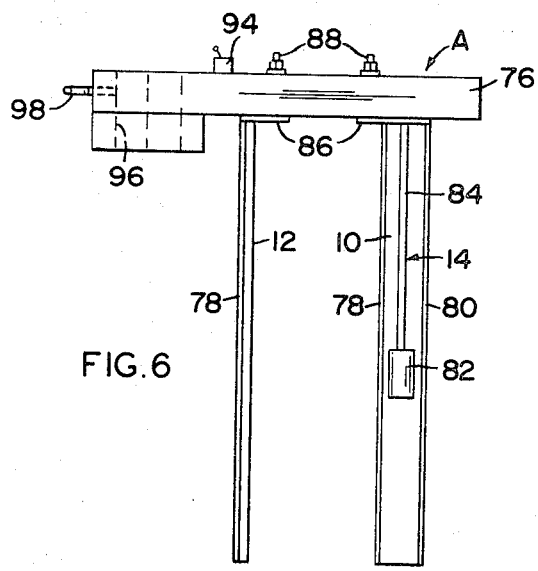
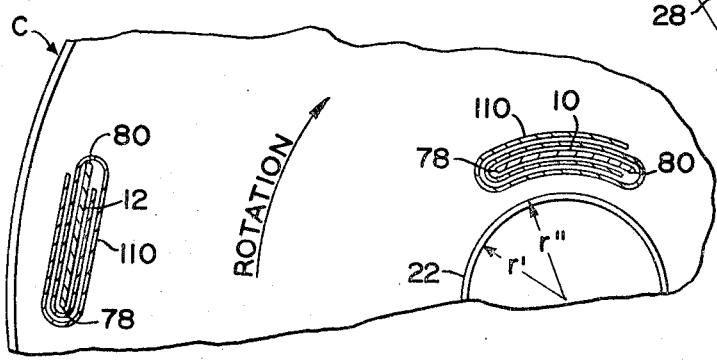

APPARATUS FOR HEATING CAULKING MATERIALS

This invention pertains to the art of heating pastelike material and more particularly to an improved apparatus and method for heating calking materials.

The invention is particularly applicable for heating bulk quantities of calking material preparatory to use and will be described with particular reference thereto; however, it should be appreciated that the invention is capable of broader application and may be used whenever it is desired heat large quantities of thixotropic, newtonian or dilatant material.

Devices in which to heat calking material have heretofore consisted to two basic varieties; the oven unit and the l belt type. The oven unit is comprised of a receptacle containing heating elements into which a container of calking material is placed, and subsequently heated by energization of the heating elements. The belt-type device is made up of a flexible heating band which encompasses the periphery of the container, thereby heating the contents by conduction when the heating band is energized.

Due to the inherent characteristics of calking materials, namely a high viscosity causing a limited degree of material mobility, the aforementioned heating devices have proved unsuccessful, One of the primary problems with both of these devices is the extensive amount of time required to heat the material to a usable temperature. In some ti instances it becomes necessary to initiate the heating operation several hours prior to use.

Another problem peculiar to the belt-type device is the tendency of material near the periphery of the container to burn or over heat, thereby rendering it unusable. Consequently, the cost per unit volume of serviceable material increases significantly.

The present invention contemplates a new and improved apparatus and method for heating calking materials preparatory to use which overcomes all of the above referred problems and others. The device permits the material to be heated in a relatively short period of time.

Furthermore, due to the configuration of the apparatus and method of heating, none of the material is burned, consequently the device is economically desirable.

In accordance with one aspect of the present invention there is provided an apparatus for heating calking material preparatory to use. The apparatus comprises a container having a bottom wall and an upwardly extending sidewall terminating in an open upper end. An elongated heater blade is provided which is dimensionally capable of being inserted in the open upper end of the container, and the requisite circuitry is supplied for energizing the heater blade. A means for causing relative rotation between the container and the heater blade is included.

In accordance with another aspect of the present invention there is provided a method for heating calking materials preparatory to use from an ambient temperature $T_a$, to a usable temperature $T_u$, in a container having an axis. The method comprises the steps of: placing substantially parallel to the axis at least one elongated heater blade in a container of calking material; producing relative rotation between the container and heater blade about the axis; increasing the temperature of the heater blade to a temperature $T_x$ which is substantially above $T_u$; maintaining the heater blade at a temperature of approximately $T_x$ until a majority of the material reaches approximately $T_a$; and thereafter, reducing the temperature of the heater blade to approximately $T_a$.

The primary object of the present invention is to provide an improved apparatus and method for heating calking materials preparatory to use.

Another object is to provide an improved apparatus and method for heating calking materials rapidly, thereby greatly reducing the waiting period prior to use.

A further object is to provide an improved apparatus and method for heating calking materials which eliminates the possibility of overheating the material during the heating operation.

Still another object is to provide an improved apparatus for heating calking materials which is easy to manufacture, dependable and economical to maintain.

A still further object is to provide an improved method for heating calking materials in a highly simplified manner.

These and other objects and advantages will become apparent from the following description when read in conjunction with the following drawings which illustrate a preferred embodiment of the invention and wherein:

FIG. 5 is a plan view of the heater arm assembly;

FIG. 6 is a side elevation of the heater arm assembly;

FIG. 7 is a pictorial view of a heating apparatus showing a modified arrangement for the apparatus of FIGS. 1—6; and FIG. 8 is a plan view showing the heater blades wrapped with a laminer.

Figure 1:
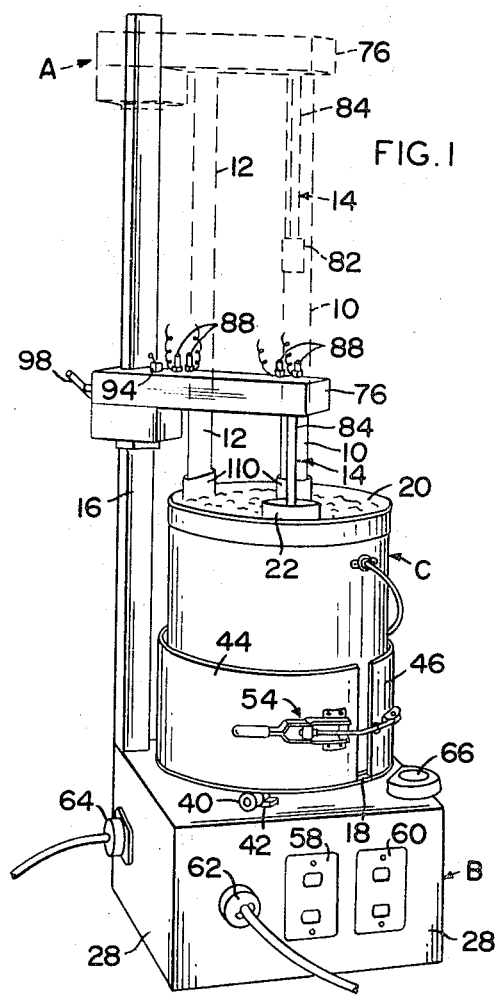
FIG. 1 is a pictorial view of a heating apparatus constructed according to the preferred embodiment of the present invention.

Referring now to the drawings wherein the showings are for the purpose of illustrating the preferred embodiment of the inventive apparatus and method only, and not for the purpose of limiting same, FIG. 1 shows a heating apparatus constructed in accordance with one aspect of the present invention being utilized to heat a container of calking material preparatory to use. The basic components of the apparatus necessary to perform this function are: a heater arm assembly A, having suspended therefrom an elongated contoured heater blade 10, an elongated flat heater blade 12 and a roller assembly 14; a base B including a vertical member 16 disposed in one corner and a horizontal turntable 18 supported above the base; and, a cylindrical container C of calking material 20 carried by the turntable and having coaxially disposed therein a removable cylindrical tube 22.

Figure 4:
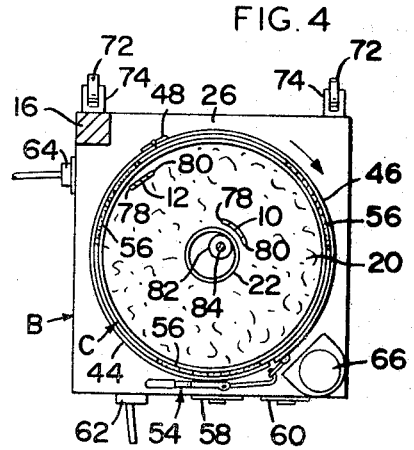
FIG. 4 is a plan view taken on line 4–4 of FIG. 2.

Referring to FIGS. 1 and 4, wherein the novel container arrangement will be described in detail. Prior to filling the conventional cylindrical container C with calking material 20, a removable cylindrical tube 22 having a cylindrical inner face with a radius $r'$, and a cylindrical outer face with a radius $r''$, is coaxially disposed within the container. The tube 22 is then held in place by the calking material 20 which fills the remaining container area. Since the cylindrical tube 22 is not filled with calking material 20, there cannot be an overheating, and possible burning, of material which is centrally located. When the calking material 20 has almost entirely been used, the cylindrical tube 22 may be removed from the container C to facilitate the loading of calking guns (not shown) and also to assure that all the material is usable.

Figure 2:
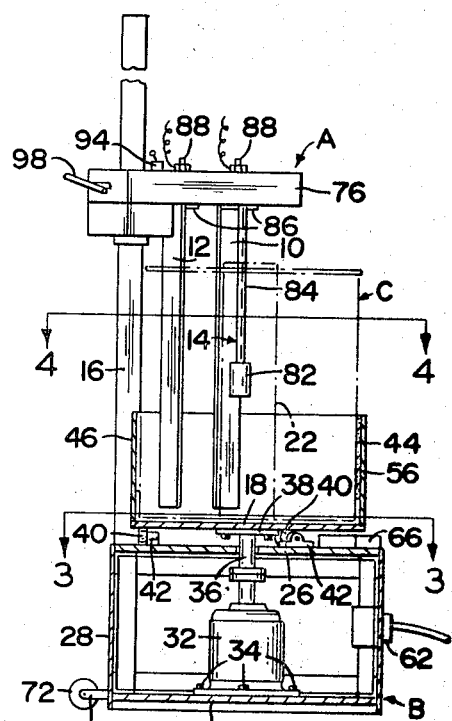
FIG. 2 is a cross-sectional view, partially cutaway showing in detail the various features of the heating apparatus of FIG. 1.
Figure 3:
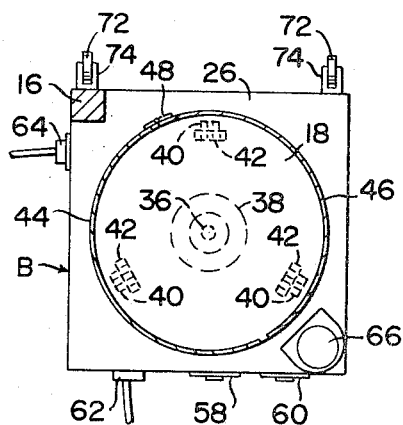
FIG. 3 is a plan view taken on line 3–3 of FIG. 2.

Referring now to FIGS. 1, 2 and 3 wherein the base B will be described in greater detail. The base B which rests on a floor surface (not shown and supports the remaining components of the apparatus comprises, an enclosure having a bottom wall 24, a top wall 26, and sidewalls 28. A vertical member 16 extends upwardly from a corner of the top wall 26 and supports the heater arm assembly A.

A means for causing relative rotation between the container C and the heater blades 10, 12 is provided by the subject invention. This means may take many forms, however, in the preferred embodiment, it is shown as a motor 32 secured to the bottom wall 24 within the base B by motor mounting bolts 34. Extending vertically upward from the motor 32 is a drive shaft 36 which passes through an opening in the top wall 26 of the base B and has mounted on its uppermost end a turntable mounting plate 38. The horizontal turntable 18, which has a diameter that exceeds that of the container C, is affixed to the turntable mounting plate 38, and supports the container to provide the requisite relative rotation. To prevent flexing of the turntable 18 and to assist in its rotation, roller supports 40 are disposed intermediate the top wall 26 of the base B and the underside of the turntable 18. The roller supports 40 are positioned below the periphery of the turntable 18 and retained in this location by rotatably mounted roller support brackets 42 which are secured to the top wall 26 of the base B.

In order to keep the container C securely on the turntable 18 during rotation, a container retaining means is provided. It is to be appreciated that numerous devices could accomplish this purpose; however, in the illustrated embodiment, the means is shown as a split ring comprised of a fixed member 44 and a pivoted member 46. The fixed member 44, having a diameter approximately equal to that of the turntable 18, is contoured to circumscribe a portion of the container C, and is permanently affixed to the edge of the turntable by a conventional method, such as welding. The pivoted member 46 also has a diameter approximately equal to that of the turntable 18, and is similarly contoured to circumscribe the remaining portion of the container C. However, it is not affixed to the turntable 18, instead one of its vertical edges is pivotally connected to the respective edge of the fixed member 44 by a hinge 48, thereby permitting it to be pivoted outwardly away from the turntable to facilitate the insertion and removal of containers. The pivoted member 46 is secured in its normal container retaining position by a clamping mechanism 54. Mounted on the inner surface of both the fixed member 44 and the pivoted member 46 are resilient grippers 56 which assist the container retaining means in keeping the container C securely on the turntable 18 during rotation.

The base B has disposed in one of the side walls 28 a motor switch 58, having an "ON" and "OFF" position, which controls the energization of the motor 32. Further disposed in the same side wall 28 is a heater blade switch 60, having an "ON" and "OFF" position, which controls the energization of the heater blades 10, 12. Additionally disposed on the same sidewall 28 is a power input plug 62 which connects the base B to the power supply (not shown). Located on another sidewall is a power output plug 64 which connects the base B to the heater blades 10, 12 to provide the necessary power for energization of the blades. A foot actuated switch 66 for deenergizing the motor 32 and heater blades 10, 12, while calking material 20 is being loaded into a calking gun (not shown) by a workman, is mounted on the top wall 26 of the base B.

In order to assure complete mobility of the apparatus, particularly when it is carrying a full container of heavy calking material, wheels 72 are provided. The wheels 72 are rotatably mounted on wheel brackets 74 which are affixed to one of the sidewalls 28 in a manner which allows the wheels to be in contact with the floor surface.

Referring now to FIGS. 1, 4, 5 and 6, wherein the heater arm assembly A will be described in more detail. Slidably mounted on the vertical member 16, and substantially perpendicular thereto, is a heater arm 76. Suspended from the underside of the heater arm 76 are the contoured heater blade 10, the flat heater blade 12 and the roller assembly 14. It is to be appreciated that the heater blades 10, 12 may have a wide range of wattage ratings; however, in the preferred embodiment the flat heater blade 12 has a 500 watt rating and the contoured heater blade 10 has a 200 watt rating. Each heater blade 10, 12 has a first edge 78 and a second edge 80 (as best shown in FIG. 5). The roller assembly 14 is comprised of a roller 82 which is rotatably mounted on a roller shaft 84. The heater blades 10, 12 and the roller assembly 14 are affixed to mounting plates 86 which are secured to the underside of the heater arm 76 by heater blade contacts 88. The electrical wires from the power output plug 64 of the base B are connected to heater blade contacts 88 to provide the requisite power for energization of the heater blades 10, 12. A double pole switch 94, having "HIGH" and "LOW" position settings, is mounted on the top surface of the heater arm 76 and controls the amount of current flowing to the heater blades 10, 12; in the "HIGH" position the heater blades are wired in parallel to put out a maximum amount of heat, whereas in the "LOW" position they are wired in series and produce about 20 percent of maximum heat.

The vertical member 16 passes through an opening 96 at one end of the heater arm 76, thereby permitting the heater arm assembly A to move upward or downward in order that the heater blades 10, 12 may be lowered into or raised out of the container C. The heater arm assembly A may be secured at any given elevation on the vertical member 16 by tightening the locking mechanism 98. However, the heater arm assembly A, under general working conditions, will either be in an upper position (as shown in FIG. 1 by dotted lines) for purposes of loading a container C on the apparatus, or in a lower position (as shown in FIG. 1 by solid lines) during the heating operation.

When the heater arm 76 is lowered the heater blades 10, 12, which are generally vertical, are forced into the calking material 20. In this position the flat heater blade 12 is disposed generally tangentially to the inner cylindrical sidewall surface of the container C, with its first edge 78 being adjacent this surface and the second edge 80 being spaced substantially from the surface so as to scrape the surface during rotation, thereby preventing the accumulation of calking material 20 on the surface. The contoured heater blade 10 is shaped to provide an inner face having a radius substantially greater than the radius $r''$ of the cylindrical tube 22, and a portion of the inner face being adjacent the outer face of the cylindrical tube, with the first and second edges, 78, 80, generally equidistant from the outer face. The roller 82 which is mounted on an axis generally parallel to and coextensive with the contoured heater blade 10 has a radius less than the radius $r'$ of the cylindrical tube, and is supported in the tube and against its inner face when the heater arm 76 is in the lower position (as best shown in FIG. 4). This configuration assures that the heater blades 10, 12 are always on the outside surface of the calking material 20, rather than cutting into the material, thus preventing air bubbles from being entrapped in the material.

Referring to FIG. 7, wherein a modified arrangement of the preferred embodiment is shown which mechanically causes relative vertical movement between the container C and the heater arm 76. Permanently affixed to the vertical member 16, at a height approximately equal to the mid point of the container C, and extending radially outward from the vertical member, is a motor platform 100 having a reversible heater arm motor 102 mounted thereon. An externally threaded drive shaft 104 extends upward from the heater arm motor 102 and is retained in a parallel relationship to the vertical member 16 by a spacing bracket 106 which is affixed to the uppermost ends of the drive shaft and vertical member. The externally threaded drive shaft 104 passes through an internally threaded opening 108 in the heater arm 76. As such, when the heater arm motor 102 is energized and driven in a counterclockwise direction the heater arm 76 will be raised, and conversely, if the motor is driven in a clockwise direction the heater arm will be lowered.

As is apparent, a variety of different methods could be employed for utilizing the above-described heating apparatus. FIGS. 1, 2 and 4 however show one particular method which is preferred.

Calking compounds which are commercially available are often generally unusable at normal ambient temperatures. As such, it becomes necessary to heat such materials to a usable temperature Tu, preparatory to use. To accomplish this, the apparatus of the subject invention is brought to the job and easily moved by wheels 72 to a convenient location. The power necessary to operate the apparatus is provided by connecting an electrical line from a power source to the power input plug 62 on the base B. An additional electrical connection is now made between the power output plug 64 on the base B and the heater blade contacts 88 on the heater arm 76. The apparatus is now ready for use.

Referring specifically to FIG. 1, the apparatus is shown with the heater arm assembly in both the upper position (dotted lines) and lower position (solid lines). At the outset the heater arm assembly A is in the upper position and the heater blades 10, 12 are at the ambient temperature Ta. The clamping mechanism 54 of the container retaining means is released and the pivoted member 46 swung outwardly, and away from, the turntable 18. The workman (not shown) now places a full container C of calking material 20, having coaxially disposed therein a cylindrical tube 22, on the turntable 18. The pivoted member 46 is swung inwardly so as to encompass the container C, and the clamping mechanism 54 actuated. The container C is now securely restrained on the turntable 18 and will not slip when rotation is induced.

With the heater arm assembly A in the upper position, and the heater blades 10, 12 at Ta, the blades are wrapped with a laminer 110, such as aluminum foil, to prevent the calking material 20 from getting on them during the heating operation, and thus eliminating the need for cleaning the heater blades at the end of a working day (FIG. 8). The laminer 110 is wrapped about the blades in the direction of rotation of the container, thus preventing it from unwrapping during rotation. The locking mechanism 98 on the heater arm 76 is released and the arm lowered from the upper position to the lower position. This procedure may be carried out by the modified arrangement of FIG. 7 which mechanically raises and lowers the heater arm assembly A, thereby eliminating the manual operation heretofore described.

The lowering of the heater arm assembly A causes the heater blades 10, 12 to be forced into the container C of calking material 20. As best shown in FIG. 4, the flat heater blade 12 is disposed tangentially to the inner cylindrical sidewall surface of the container C, and its first edge 78 is adjacent the surface for purposes of scraping. Furthermore, the contoured heater blade 10 is shaped to be adjacent a portion of the outer face of the cylindrical tube 22. Additionally, the roller assembly 14 has been inserted in the cylindrical tube 22 such that the roller 82 tends to press the tube towards the contoured heater blade 10. Once the heater arm assembly A is in the lower position the locking mechanism 98 is engaged to assure that the assembly will not move during heating and rotation.

The motor 32 is now energized by placing the motor switch 58 in the "ON" position. This causes relative rotation between the container C and the heater blades 10, 12. Although various rates of rotation could be employed, in the preferred method the rate of rotation of the turntable 18 and hence the container C is from 2 to 5 r.p.m. During rotation, the first edge 78 of the flat heater blade 12 scrapes the inner cylindrical sidewall surface of the container C to prevent the buildup of calking material 20, but never cuts into the material.

After the motor 32 is activated the heater blades 10, 12 are energized by placing the heater blade switch 60 in the "ON" position. At the same time the double pole switch 94 on heater arm 76 is set in the "HIGH" position to electrically connect the heater blades 10, 12 in parallel, thereby increasing the temperature of the heater blades to a temperature Tx, which is substantially above Tu. This setting is maintained, and rotation continues, until a majority of the calking material 20 reaches approximately Tu. It is to be appreciated that Tu may vary greatly depending upon the composition of the calking material; however, when the material is a commercially available acrylic terpolymer sealant, Tu comprises the temperature range from 110°F. to 125°F. When the calking material reaches Tu, the setting of the double pole switch 94 is changed from "HIGH" to "LOW". This causes the heater blades 10, 12 to be electrically connected in series and reduces their heat output to approximately 20 percent of that produced on the "HIGH" setting. However, the heater blades 10, 12 continue to operate at approximately Tu, thereby maintaining the calking material 20 at a usable temperature.

When a workman desires to fill his calking gun (not shown) with the calking material 20 he approaches the apparatus and depresses the foot actuated switch 66, which deenergizes the heater blades 10, 12 and the motor 32. The calking gun is then inserted in the container C and filled with calking material 20. When approximately 60 percent of the calking material 20 has been used, the cylindrical tube 22 may be removed from the center of the container C to facilitate further fillings of calking guns and to assure that the entire contents of the container are used, thereby preventing waste.

At the end of a working day the heater arm assembly A is raised to the upper position, thereby removing the heater blades 10, 12 from the container C, which is now removed from the turntable 18. The laminer 110 is striped from the heater blades 10, 12, leaving them clean and ready for future use.

The invention has been described in great detail sufficient to enable one of ordinary skill in the art to make and use the same.

I claim:

1. An apparatus for heating calking materials preparatory to use, comprising: a container having a bottom wall and an upwardly extending sidewall terminating in an open upper end, said sidewall including an inner cylindrical surface having a radius $x$; and a generally vertical axis; a first elongated heater blade with first and second edges and having a transverse dimension less than the radius $x$; a second heater blade spaced from said first blade; means for supporting said blades generally vertically in said container; means for electrically energizing said heater blades; and rotating means for causing relative rotation between said container and heater blade, whereby said material is heated by said blades, said first blade being adjacent said cylindrical surface and said second blade being adjacent the center of said container.

2. The apparatus defined in claim 1, wherein said container has coaxially disposed therein a cylindrical tube having a cylindrical inner face with a radius $r'$ and a cylindrical outer face with a radius $r''$.

3. The apparatus defined in claim 1, wherein said first heater blade is flat and disposed generally tangentially to the inner cylindrical sidewall surface of said container with said first edge being adjacent said surface and said second edge being spaced substantially away from said cylindrical side surface wherein said first blade scrapes along said surface to prevent the calking material from accumulating on said surface during relative rotation between said container and said heater blades.

4. The apparatus defined in claim 2, wherein said second heater blade is contoured to provide an inner face having a radius substantially greater than the radius $r$–, a portion of said inner face being adjacent said outer face of said cylindrical tube.

5. The apparatus as defined in claim 4 wherein said second blade has first and second edges and the first and second edges of said second heater blade are generally equidistant from said outer face of said cylindrical tube.

6. The apparatus defined in claim 5, including a roller mounted on a axis generally parallel to and substantially coextensive with said contoured second heater blade, said roller having a radius less than the radius $r'$ of said cylindrical tube, and means for supporting said roller in said cylindrical tube and against said inner face.

7. The apparatus defined in claim 1, including means for causing relative vertical movement between said container and said heater blade, whereby said heater blade may be lowered into and raised out of said container.

8. The apparatus defined in claim 7, including motor means for causing relative vertical movement between said container and heater blade.